US011423392B1

(12) United States Patent
Ho et al.

(10) Patent No.: US 11,423,392 B1
(45) Date of Patent: Aug. 23, 2022

(54) SYSTEMS AND METHODS FOR INFORMATION VERIFICATION USING A CONTACTLESS CARD

(71) Applicant: WELLS FARGO BANK, N.A., San Francisco, CA (US)

(72) Inventors: Peter Ho, San Francisco, CA (US); John A. Aurelius, San Francisco, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 30 days.

(21) Appl. No.: 17/108,832

(22) Filed: Dec. 1, 2020

(51) Int. Cl.
G06Q 20/34 (2012.01)
G06Q 30/06 (2012.01)
G06Q 20/40 (2012.01)

(52) U.S. Cl.
CPC ......... *G06Q 20/346* (2013.01); *G06Q 20/352* (2013.01); *G06Q 20/353* (2013.01); *G06Q 20/409* (2013.01); *G06Q 30/0609* (2013.01)

(58) Field of Classification Search
CPC .. G06Q 20/346; G06Q 20/352; G06Q 20/353; G06Q 20/409; G06Q 30/0609
See application file for complete search history.

(56) References Cited

U.S. PATENT DOCUMENTS 6,324,524 B1 11/2001 Lent et al.
7,121,456 B2 10/2006 Spaeth et al.
8,205,249 B2 6/2012 Meister et al.
8,245,292 B2 8/2012 Buer
8,313,022 B2 11/2012 Hammad et al.
8,352,323 B2 1/2013 Fisher
(Continued)

FOREIGN PATENT DOCUMENTS

GB 2 476 989 A 7/2011
WO WO-2005/098737 A2 10/2005
(Continued)

OTHER PUBLICATIONS

Borchert, B.; Gunther, M.;Indirect NFC-Login on a Non-NFC Device using an NFC-Smartphone; international Journal of Intelligent Computing Research; vol. 4, Iss. 4, Dec. 2013; 7 Pages.
(Continued)

*Primary Examiner* — Sonji N Johnson
(74) *Attorney, Agent, or Firm* — Foley & Lardner LLP

(57) ABSTRACT

A method, apparatus, and system of using a contactless card are disclosed. For example, a method of verifying at least a portion of manually entered user information using a contactless card is disclosed. The method includes receiving an application including manually-entered user information via one or more user inputs into a customer device, providing a request to verify at least a portion of the user information to the customer device, the request configured to cause the customer device to prompt the user to tap a contactless card to the customer device, based on a contactless communication between the contactless card and the customer device, receiving, from a third party computing system, an indication of that the portion of the user information and information stored by the third party computing system match, and approving the application for the new product or service based on the indication of the match.

20 Claims, 7 Drawing Sheets

(56) References Cited

U.S. PATENT DOCUMENTS

| | | |
|---|---|---|
| 8,355,982 B2 | 1/2013 | Hazel et al. |
| 8,380,177 B2 | 2/2013 | Laracey |
| 8,430,325 B2 | 4/2013 | Jain |
| 8,452,707 B2 | 5/2013 | Sharma |
| 8,511,547 B2 | 8/2013 | Rans et al. |
| 8,635,157 B2 | 1/2014 | Smith et al. |
| 8,639,629 B1 | 1/2014 | Hoffman |
| 8,763,896 B2 | 7/2014 | Kushevsky et al. |
| 8,856,045 B1 | 10/2014 | Patel et al. |
| 8,910,055 B2 | 12/2014 | Berger |
| 8,977,569 B2 | 3/2015 | Rao |
| 9,135,619 B1 | 9/2015 | Simakov et al. |
| 9,183,480 B1 | 11/2015 | Quigley et al. |
| 9,195,984 B1 | 11/2015 | Spector et al. |
| 9,256,873 B2 | 2/2016 | Patel et al. |
| 9,317,848 B2 | 4/2016 | Hammad |
| 9,367,845 B2 | 6/2016 | Candelore et al. |
| 9,542,673 B2 | 1/2017 | Tanner et al. |
| 9,547,859 B2 | 1/2017 | Patel et al. |
| 9,576,285 B2 | 2/2017 | Zhou |
| 9,619,794 B2 | 4/2017 | Zhou et al. |
| 9,652,770 B1 | 5/2017 | Kurani et al. |
| 9,785,943 B2 | 10/2017 | Phillips et al. |
| 9,805,370 B1 | 10/2017 | Quigley et al. |
| 9,830,328 B2 | 11/2017 | Faith et al. |
| 9,830,589 B2 | 11/2017 | Xing |
| 9,846,863 B2 | 12/2017 | Grossi et al. |
| 9,852,426 B2 | 12/2017 | Bacastow |
| 9,928,493 B2 | 3/2018 | Parker et al. |
| 9,947,183 B2 | 4/2018 | Priebatsch |
| 10,049,352 B2 | 8/2018 | Klingen et al. |
| 10,074,231 B2 | 9/2018 | Miranda et al. |
| 10,089,624 B2 | 10/2018 | Hammad et al. |
| 10,162,956 B1 | 12/2018 | Truong et al. |
| 10,198,725 B2 | 2/2019 | Royyuru et al. |
| 10,373,138 B2 | 8/2019 | Hammad |
| 10,438,210 B1 | 10/2019 | Perezleon et al. |
| 10,586,224 B2 | 3/2020 | Tanner et al. |
| 10,607,214 B1 | 3/2020 | Rule et al. |
| 10,685,349 B2 | 6/2020 | Brickell et al. |
| 10,719,833 B2 | 7/2020 | Patel et al. |
| 10,803,463 B1 | 10/2020 | Barnum et al. |
| 2002/0023051 A1 | 2/2002 | Kunzle et al. |
| 2003/0061154 A1 | 3/2003 | Chacko |
| 2005/0234860 A1 | 10/2005 | Roever et al. |
| 2005/0246193 A1 | 11/2005 | Roever et al. |
| 2005/0269402 A1 | 12/2005 | Spitzer et al. |
| 2006/0035707 A1 | 2/2006 | Nguyen et al. |
| 2007/0187491 A1 | 8/2007 | Godwin et al. |
| 2008/0010215 A1 | 1/2008 | Rackley, III et al. |
| 2008/0035725 A1 | 2/2008 | Jambunathan et al. |
| 2008/0242274 A1 | 10/2008 | Swanburg et al. |
| 2009/0143104 A1 | 6/2009 | Loh et al. |
| 2009/0156238 A1 | 6/2009 | Smith |
| 2009/0200371 A1 | 8/2009 | Kean et al. |
| 2010/0125509 A1 | 5/2010 | Kranzley et al. |
| 2010/0161470 A1 | 6/2010 | Wiesman et al. |
| 2010/0198728 A1 | 8/2010 | Aabye et al. |
| 2010/0276484 A1 | 11/2010 | Banerjee et al. |
| 2010/0293382 A1 | 11/2010 | Hammad |
| 2010/0306072 A1 | 12/2010 | Ford et al. |
| 2010/0312703 A1 | 12/2010 | Kulpati et al. |
| 2011/0112968 A1 | 5/2011 | Florek et al. |
| 2011/0270755 A1 | 11/2011 | Pinski |
| 2012/0039469 A1 | 2/2012 | Mueller |
| 2012/0078735 A1 | 3/2012 | Bauer et al. |
| 2012/0095852 A1 | 4/2012 | Bauer et al. |
| 2012/0136786 A1 | 5/2012 | Romagnoli et al. |
| 2012/0149331 A1 | 6/2012 | Wu et al. |
| 2012/0209749 A1 | 8/2012 | Hammad et al. |
| 2012/0290449 A1 | 11/2012 | Mullen et al. |
| 2012/0290472 A1 | 11/2012 | Mullen et al. |
| 2012/0323717 A1 | 12/2012 | Kirsch |
| 2013/0054412 A1 | 2/2013 | Brendell et al. |
| 2013/0054474 A1 | 2/2013 | Yeager |
| 2013/0092741 A1 | 4/2013 | Loh et al. |
| 2013/0117138 A1 | 5/2013 | Hazel et al. |
| 2013/0124346 A1 | 5/2013 | Baldwin et al. |
| 2013/0152185 A1 | 6/2013 | Singh et al. |
| 2013/0159178 A1 | 6/2013 | Colon et al. |
| 2013/0166441 A1 | 6/2013 | Kobylkin et al. |
| 2013/0171929 A1 | 7/2013 | Adams et al. |
| 2013/0198066 A1 | 8/2013 | Wall et al. |
| 2013/0226791 A1 | 8/2013 | Springer et al. |
| 2013/0238455 A1 | 9/2013 | Laracey |
| 2013/0246203 A1 | 9/2013 | Laracey |
| 2013/0262302 A1 | 10/2013 | Lettow et al. |
| 2013/0317928 A1 | 11/2013 | Laracey |
| 2013/0318575 A1 | 11/2013 | Hart et al. |
| 2014/0001253 A1 | 1/2014 | Smith |
| 2014/0019352 A1 | 1/2014 | Shrivastava |
| 2014/0052637 A1 | 2/2014 | Jooste et al. |
| 2014/0061299 A1 | 3/2014 | Scipioni |
| 2014/0074637 A1 | 3/2014 | Hammad |
| 2014/0101734 A1 | 4/2014 | Ronda et al. |
| 2014/0108260 A1 | 4/2014 | Poole et al. |
| 2014/0108263 A1 | 4/2014 | Ortiz et al. |
| 2014/0110477 A1 | 4/2014 | Hammad |
| 2014/0114780 A1 | 4/2014 | Menefee et al. |
| 2014/0122331 A1 | 5/2014 | Vaish et al. |
| 2014/0129435 A1 | 5/2014 | Pardo et al. |
| 2014/0161258 A1 | 6/2014 | Yang et al. |
| 2014/0172577 A1 | 6/2014 | Rephlo |
| 2014/0207680 A1 | 7/2014 | Rephlo |
| 2014/0279522 A1 | 9/2014 | Musser et al. |
| 2014/0324698 A1 | 10/2014 | Dolcino et al. |
| 2014/0337236 A1 | 11/2014 | Wong et al. |
| 2014/0339315 A1 | 11/2014 | Ko |
| 2014/0344153 A1 | 11/2014 | Raj et al. |
| 2014/0370851 A1 | 12/2014 | Wang et al. |
| 2014/0372308 A1 | 12/2014 | Sheets |
| 2015/0004934 A1 | 1/2015 | Qian et al. |
| 2015/0032625 A1 | 1/2015 | Dill et al. |
| 2015/0046276 A1 | 2/2015 | Artman et al. |
| 2015/0046339 A1 | 2/2015 | Wong et al. |
| 2015/0046340 A1 | 2/2015 | Dimmick |
| 2015/0081538 A1 | 3/2015 | Renard et al. |
| 2015/0149336 A1 | 5/2015 | Haggerty et al. |
| 2015/0156601 A1 | 6/2015 | Donnellan et al. |
| 2015/0161591 A1 | 6/2015 | Yang |
| 2015/0170137 A1 | 6/2015 | Balbus |
| 2015/0186871 A1 | 7/2015 | Laracey |
| 2015/0195133 A1 | 7/2015 | Sheets et al. |
| 2015/0248664 A1 | 9/2015 | Makhdumi et al. |
| 2015/0269565 A1 | 9/2015 | Inotay et al. |
| 2015/0356560 A1 | 12/2015 | Shastry et al. |
| 2015/0371234 A1 | 12/2015 | Huang et al. |
| 2016/0078434 A1 | 3/2016 | Huxham et al. |
| 2016/0086166 A1 | 3/2016 | Pomeroy et al. |
| 2016/0147526 A1 | 5/2016 | Camp et al. |
| 2016/0162883 A1 | 6/2016 | Liscia et al. |
| 2016/0173483 A1 | 6/2016 | Wong et al. |
| 2016/0180330 A1 | 6/2016 | Feldman |
| 2016/0232524 A1 | 8/2016 | Barrale et al. |
| 2016/0241402 A1 | 8/2016 | Gordon et al. |
| 2016/0247233 A1 | 8/2016 | Page |
| 2016/0253651 A1 | 9/2016 | Park et al. |
| 2016/0292673 A1 | 10/2016 | Chandrasekaran |
| 2016/0307184 A1 | 10/2016 | Peyton et al. |
| 2016/0307186 A1 | 10/2016 | Noe et al. |
| 2016/0364938 A1 | 12/2016 | Miranda et al. |
| 2017/0004506 A1 | 1/2017 | Steinman et al. |
| 2017/0046679 A1 | 2/2017 | Gotlieb et al. |
| 2017/0109745 A1 | 4/2017 | Al-Bedaiwi et al. |
| 2017/0116615 A1 | 4/2017 | Burgess et al. |
| 2017/0262819 A1 | 9/2017 | Malhotra et al. |
| 2018/0012226 A1 | 1/2018 | Phillips et al. |
| 2018/0025349 A1 | 1/2018 | Marsh |
| 2018/0047022 A1 | 2/2018 | Schipperheijn |
| 2018/0053157 A1 | 2/2018 | Roffey |
| 2018/0089677 A1 | 3/2018 | Ali et al. |
| 2018/0101672 A1 | 4/2018 | George |
| 2018/0181978 A1 | 6/2018 | Weinberger et al. |
| 2018/0197171 A1 | 7/2018 | Steinman et al. |

(56) References Cited

U.S. PATENT DOCUMENTS

| | | | |
|---|---|---|---|
| 2018/0233001 A1 | 8/2018 | Priebatsch | |
| 2018/0255460 A1 | 9/2018 | Hammad et al. | |
| 2018/0285868 A1 | 10/2018 | O'Hara et al. | |
| 2018/0336562 A1 | 11/2018 | Umanski et al. | |
| 2019/0001732 A1 | 1/2019 | Ongsitco | |
| 2019/0005494 A1 | 1/2019 | Hammad et al. | |
| 2019/0066113 A1 | 2/2019 | Gupta et al. | |
| 2019/0087823 A1 | 3/2019 | Patel et al. | |
| 2019/0122222 A1 | 4/2019 | Uechi | |
| 2019/0197553 A1 | 6/2019 | Conway | |
| 2019/0332912 A1 | 10/2019 | Walker | |
| 2020/0019725 A1 | 1/2020 | Rule et al. | |
| 2020/0104833 A1 | 4/2020 | Rule et al. | |
| 2020/0106614 A1 | 4/2020 | Rule et al. | |
| 2020/0106619 A1 | 4/2020 | Osborn et al. | |
| 2020/0154278 A1 | 5/2020 | Douglas et al. | |
| 2020/0202322 A1 | 6/2020 | Tanner et al. | |
| 2020/0242616 A1 | 7/2020 | Waughtal | |
| 2020/0314644 A1 | 10/2020 | Dean et al. | |
| 2022/0092589 A1* | 3/2022 | Osborn | G06Q 20/40975 |

FOREIGN PATENT DOCUMENTS

| | | |
|---|---|---|
| WO | WO-2005/119607 A2 | 12/2005 |
| WO | WO-2005/119608 A1 | 12/2005 |
| WO | WO-2006/023839 A2 | 3/2006 |
| WO | WO-2007/038896 A2 | 4/2007 |
| WO | WO-2007/076476 A2 | 7/2007 |
| WO | WO-2010/033944 A2 | 3/2010 |
| WO | WO-2010/127244 A2 | 11/2010 |
| WO | WO-2010/127244 A3 | 11/2010 |
| WO | WO-2012/042262 A1 | 4/2012 |
| WO | WO-2013/010096 A1 | 1/2013 |
| WO | WO-2014/170668 A1 | 10/2014 |
| WO | WO-2015/104387 A1 | 7/2015 |
| WO | WO-2016/001867 A2 | 1/2016 |
| WO | WO-2016/028779 A1 | 2/2016 |
| WO | WO-2016/049745 A1 | 4/2016 |
| WO | WO-2017/096399 A1 | 6/2017 |
| WO | WO-2017/174200 A3 | 10/2017 |
| WO | WO-2020/122898 A1 | 6/2020 |

OTHER PUBLICATIONS

FIDO Alliance. Open Authentication Standards More Secure than Passwords. fidoalliance.org. Accessed Jul. 23, 2019.

Kadambi et al., "Near-Field Communication-Based Secure Mobile Payment Service", Proceedings of the 11th International Conference on Electronic Commerce, ACM, 2009.

Liao, Shannon. "Google will not let you use your Android phone as a physical security key." www.theverge.com/2019/4/10/18295348/google-android-phone-fido-webauthn-phishing-two-factor-authentication. Apr. 10, 2019. Accessed Jul. 23, 2019.

Liao, Shannon. "Google will now let you use your Android phone as a physical security key." www.theverge.com/2019/4/10/18295348/google-android-phone-fido-webauthn-phishing-two-factor-authentication., Apr. 10, 2019. Accessed Jul. 23, 2019.

Poroye, Adeola Oluwaseyi. "Secure contactless mobile financial services with Near Field Communication", Diss. University of the Western Cape, 2011. Located via Google Scholar, http://etd.uwc.ac.za/bitstream/handle/11394/1752/Poroye_MSC_2011.pdf?sequence=1.

Robert Triggs, "All you need to know about NFC Tags", Android Authority, Aug. 29, 2018, p. 2 (Year: 2018).

Russell, "3 Reasons Why Tap and Pay (NFC) is Awesome", Jun. 9, 2018, Helcim Articles (Year: 2018).

Triggs, R., "All You Need to Know About NFC Tags," Android Authority, Aug. 29, 2018, 6 pages.

Wong, Wen Teng. "Security of NFC payment on mobile payment application", Diss. UTAR, 2018. Located via Google Scholar, http://eprints.utar.edu.my/3050/1/fyp_CS_2018_WWT_-_1403709.pdf.

Yang, "Security Enhanced EMV-Based Mobile Payment Protocol", Hindawi Publishing Corporation, The Scientific World Journal, vol. 214, Article ID 864571, 2014, 19 pages.

\* cited by examiner

US 11,423,392 B1

SYSTEMS AND METHODS FOR INFORMATION VERIFICATION USING A CONTACTLESS CARD

TECHNICAL FIELD

Embodiments of the present disclosure relate to systems and methods for providing, activating, and using a contactless card.

BACKGROUND

Financial institutions such as banks and other card issuers typically offer customers a variety of accounts (e.g., credit card, checking, loan, savings, rewards card, etc.). As part of the application for one or more accounts the customer may be required to input personal identification information (PII) (e.g., legal name, address, etc.) that is used to establish the identity and credit worthiness of the customer. The personal identification information may be entered by the customer into an online portal of the financial institution without verification of whether the personal information is complete and/or accurate. Moreover, a customer may use the account to perform an online transaction by manually entering the account information into an online portal provided by a merchant. Accordingly, current processes may expose the financial institution and merchant to fraudsters. Additionally, the contactless card may be issued upon approval for the application in an inactive state. Upon receipt of the contactless card, the user must first activate the card, which has traditionally been done by a user calling a number associated with the card and entering in various information into a telephone during a call.

SUMMARY

Another embodiment relates to a method of verifying at least a portion of manually entered user information in an application. The method includes receiving, by a provider institution computing system, an application for a new product or service, the application including manually-entered user information via one or more user inputs into a customer device, providing a request to verify at least a portion of the user information to the customer device, the request configured to cause the customer device to prompt the user to tap a contactless card to the customer device, based on a contactless communication between the contactless card and the customer device, receiving, by the provider institution computing system from a third party computing system, an indication of that the portion of the user information and information stored by the third party computing system match, wherein the third party computing system is a provider of the contactless card, and approving, by the provider institution computing system, the application for the new product or service based on the indication of the match.

Another embodiment relates to a system including a processor and a memory storing computer-readable instructions. The instructions, when executed by the processor configured to cause operations including receive an application for a new product or service, the application including entered user information of an applicant via one or more user inputs into a customer device, provide a request to verify at least a portion of the user information to the customer device, the request configured to cause the customer device to prompt a user to tap a contactless card to the customer device, based on a contactless communication between the contactless card and the customer device, generating an address verification service (AVS) message to a third party computing system, where the third party computing system is a provider of the contactless card, receive, from the third party computing system, an indication that the portion of the entered user information and information stored by the third party computing system match, and approve the application for the new product or service based at least in part on the indication of the match.

Yet another embodiment relates to a non-transitory computer readable media storing instructions thereon. The instructions, when executed by one or more processors cause operations including receive an application for a new product or service, the application including entered user information of an applicant via one or more user inputs into a customer device, provide a request to verify at least a portion of the user information to the customer device, the request configured to cause the customer device to prompt a user to tap a contactless card to the customer device, based on a contactless communication between the contactless card and the customer device, generate an address verification service (AVS) message to a third party computing system, where the third party computing system is a provider of the contactless card, receive, from the third party computing system, an indication that the portion of the entered user information and information stored by the third party computing system match, and approve, by the provider institution computing system, the application for the new product or service based at least in part on the indication of the match.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
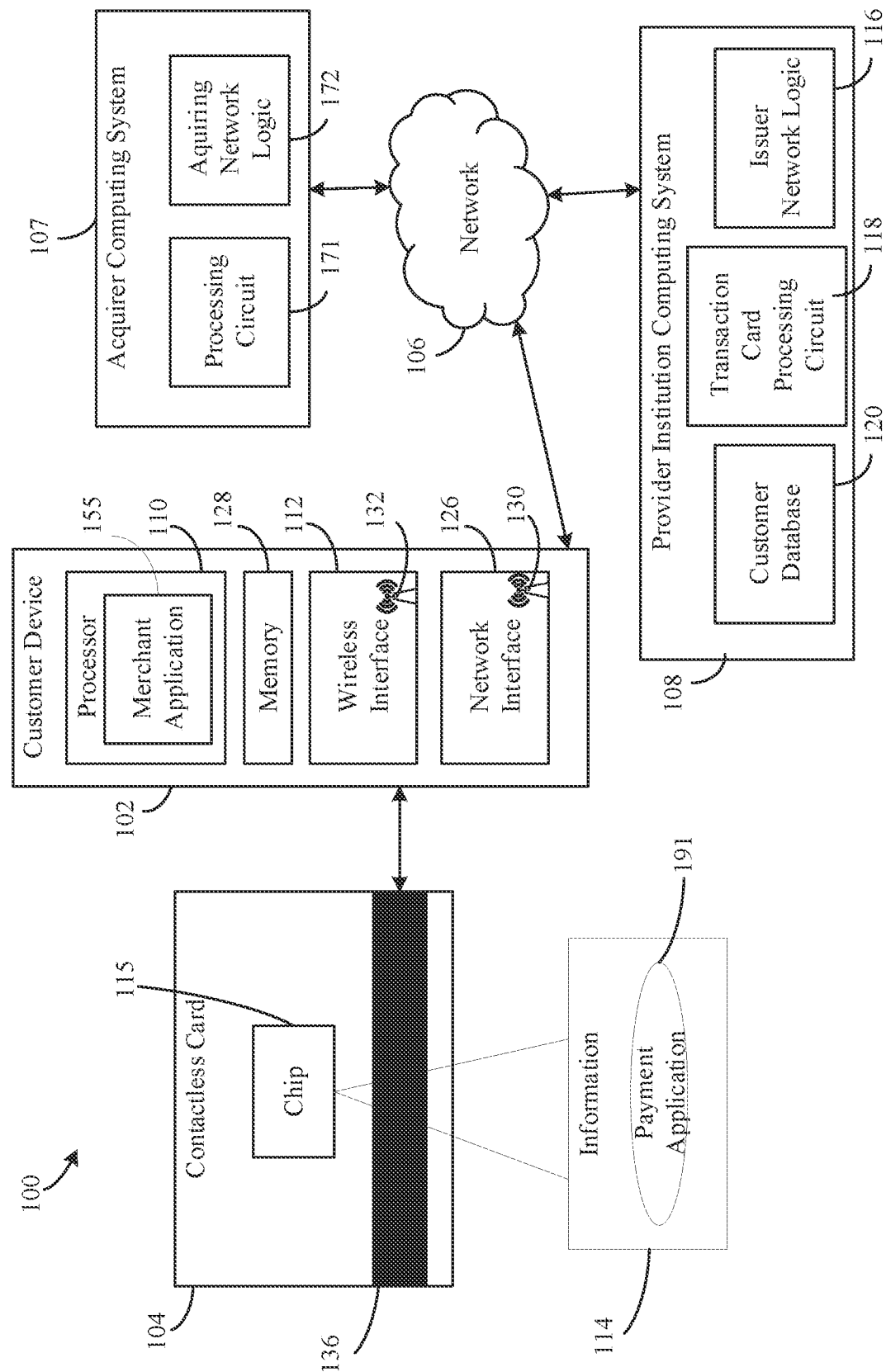
FIG. 1 is a block diagram of a contactless card system, according to an example embodiment.

Systems, apparatuses, and methods for providing, operating, and leveraging the capabilities of a contactless card system are disclosed according to various embodiments herein. A "contactless card" (also referred to as a "smart card") is a physical transaction card (e.g., formed of plastic, metal, a combination thereof, etc.) comprising an integrated circuit with a wireless transmission antenna that allows the card to wirelessly transmit information to a contactless receiver, such as certain point of sale (POS) terminals. The contactless card may be a credit card, a debit card, or the like. The wireless transmission may be a radio field transmission and, particularly, is a contactless communication, for example, implementing the ISO/IEC 14443 standard. When used in a payment transaction, the information transmitted may relate to an account associated with the contactless card (e.g., a payment account number such as a credit card account number). The circuit may store and process information relating to the transaction. In operation, the contactless card may be "tapped" (i.e., brought into a contact or near contact situation) with the contactless transceiver (e.g., the POS) to enable the exchange of information from the card to the contactless transceiver. The contactless card may also include other features such as a magnetic stripe. Additionally, the chip of the contactless card may be structured to additionally enables the card to be dipped (i.e., inserted) into a reader.

As used herein, the term "tap" or "tapped" as used to describe the interaction between a contactless card and a contactless reader refers to the two devices coming into a contact or near contact situation with each other such that a wireless transmission of information is possible (e.g., from the card to the customer device). Based on the wireless transmission protocol used, the distance required for the proximity based payment (e.g., tap or contactless communication) may vary. For example and with reference to contactless communication, the devices are brought to a distance of approximately 10 cm or less of each other. However, a Bluetooth transmission protocol may allow a bigger distance between the devices. Accordingly, the "tap" as described herein means a contactless communication unless otherwise specified. As also used herein, the term "authentication" generally refers to the identification of a transaction by the contactless card to ensure that only allowed users of the card are permitted to use the card. "Authorization" refers to approving the transaction based on the authentication. As also used herein, the term "activation" as used in reference to a state of the contactless card refers to the state of the account associated with the contactless card. When deactivated or in an inactive state, the account associated with the card is not allowed to complete a transaction. When activated, the account associated with the card may be used in various transactions, such as a payment transaction. Thus, even when deactivated, transactions involving the contactless card may be attempted (e.g., a card swipe or dip). However, these transactions are denied because the account associated with the card is not activated.

Referring now to FIG. 1, a contactless card system 100 is shown according to an example embodiment. The system 100 includes a customer device 102 associated with a customer/user, a contactless card 104, a network 106, an acquirer computing system 107, and a provider institution computing system 108. The network 106 may be any type of type of network. For example, the network 106 may be a wireless network interface (e.g., Internet, WI-FI, etc.), a wired network interface (e.g., Ethernet), or any combination thereof. While the network 106 generally refers to the definition provided above, in some embodiments, the network 106 also includes financial networks associated with various payment brands (e.g., card networks such as Visa®, American Express®, Discover®, MasterCard®, etc.). When the network 106 is used to refer to these types of networks, the term "card network" or "payment network" is used herein. Otherwise, the aforementioned definition for the network 106 is intended. The network 106 is structured to permit the exchange of data, values, instructions, messages, and the like between and among various components of FIG. 1.

The customer device 102 is owned by or otherwise associated with a customer/user. The user may be an individual, business representative, large and small business owner, and so on. The user or customer may be an existing or a new customer to the provider institution associated with the provider institution computing system 108. The customer device 102 is structured to enable the user to access the network 106 (e.g., to send and receive information/data over the network). The customer device 102 is also structured as a contactless reader structured to enable the reception of information wirelessly from the contactless card 104. Examples of the customer device 102 include a mobile device, such as a mobile phone, a smartphone, a tablet, a wearable computing device (e.g., eyewear), a laptop etc. In the example shown, the customer device 102 is structured as a mobile device. In other embodiments, the customer device 102 may be a different computing device, such as a desktop computer or an ATM that has connectivity to the internet. In the example shown, the customer device 102 includes a processor 110, memory 128, a wireless chip or interface 112, and a network interface 126. Thus, the customer device 102 includes at least two interfaces: interface 112 that is structured to enable communications with the contactless card 104, and network interface 126 that enables communications over the network 106.

The customer device 102 may include program logic (e.g., instructions) stored by the memory 128 and executable by the processor 110 to implement at least some of the functions described herein. The processor 110 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 128 (e.g., RAM, NVRAM, ROM, Flash Memory, hard disk storage, etc.) may store data and/or computer code for facilitating the various processes described herein. Moreover, the one or more memory devices 128 may be or include tangible, non-transient volatile memory or non-volatile memory. Accordingly, the one or more memory devices 128 may include database components, object code components, script components, or any other type of information structure for supporting the various activities and information structures described herein.

In some embodiments, the processor 110 may be configured to download and execute a software application of the customer device 102. For example, a developer may make or create the software application to be downloaded (e.g., via the developer's website, via an app store, or in another manner). Responsive to a customer selection of an appropriate link, the software application can be transmitted to the customer device 102 and cause itself to be installed on the customer device 102. Installation of the software application creates a customer application that is executable by the processor 110. Examples of downloadable applications include a mobile banking application, a mobile wallet application, and so on. The processor 110 is also structured to execute thick client applications as well (e.g., via a web browser). In either situation, the execution of the application (either thick, thin, or smart client application) may enable the user to access one or more accounts of the customer (e.g., provided and maintained by the card issuer). Or, more generally, execution of the application allows functions associated with that application. In operation, the processor 110 is structured to automatically launch an application (e.g., a web browser) in response to receiving embedded data (e.g., data on the chip 115 accessible via the interface 112) as a result of a contact or near-contact engagement with the contactless card 104 (e.g., an contactless communication).

In some embodiments, the processor 110 may be configured to access, retrieve, and/or execute code to act as a point of sale (POS) terminal. In general terms, the processor 110 may be configured to download, access from the network, and/or execute a merchant application 155 that includes executable code that transforms or enables the customer device 102 to activate a wireless antenna 132 that allows the customer device 102 to communicate with a wireless chip of the contactless card 104. For example, the processor 110 may be able to executed hypertext markup language (HTML) code accessed or received via a web page of a merchant in order to provide a customer with the ability to complete a transaction via the customer device 102 over the network. In some embodiments, the processor 110 is configured to execute code (e.g., HTML code accessed via the network or software application code) in order to act as a POS terminal. Generally, the customer device 102 acting like a POS terminal allows the customer device 102 to receive payment information from contactless card 104 via a close range communication (e.g., a contactless communication), generate a cryptogram from the payment information, and transmit the cryptogram to the acquirer computing system 107 as a part of the process of executing a transaction. The use of the customer device 102 as a POS terminal is discussed in further detail in reference to FIGS. 2-4.

The network interface 126 may include one or more antennas 132 and associated communications hardware and logic. The network interface 126 is structured to allow the processor 110 to access and connect to the network 106 to, in turn, exchange information with for example the provider institution computing system 108. That is, the network interface 126 is coupled to the processor 110 and memory 128 and configured to enable a coupling to the network 106. The network interface 126 allows for the customer device 102 to transmit and receive internet data and telecommunication data. Accordingly, the network interface 126 includes any one or more of a cellular transceiver (e.g., CDMA, GSM, LTE, etc.), a wireless network transceiver (e.g., 802.11X, ZigBee, WI-FI, Internet, etc.), and a combination thereof (e.g., both a cellular transceiver and a wireless network transceiver).

The customer device 102 further includes wireless chip 112. The wireless chip 112 includes a radio frequency (RF) antenna 130. The wireless chip 112 (also referred to as a wireless interface 112) is structured to enable other non-network communications. In particular, the wireless interface 112 is structured to enable relatively short distance wireless communications with other devices. In the example shown, the wireless chip 112 is a contactless interface (e.g., a contactless transceiver) coupled to the processor 110 and configured to transmit and receive data. The wireless chip 112 includes hardware and associated logic structured to enable the customer device 102 to wirelessly and securely exchange data over short distances. In various other arrangements, the wireless chip 112 is configured to use radio frequency identification (RFID) to exchange digital information.

In certain arrangements, the network interface 126 and/or wireless interface 112 may include cryptography capabilities to establish a secure or relatively secure communication session with the provider institution computing system 108 or the contactless card 104. In this regard, data may be encrypted to prevent or substantially prevent the threat of hacking.

It should be understood that the customer device 102 may include other structures with associated functionality as well. For example, the customer device 102 may include a global positioning system (GPS) structured to at least one of determine or receive data indicative of the location of the customer device 102. This "location data" may provide an indication of a location of the customer device 102. In certain embodiments, location data may be used as part of an authentication process for activation of the contactless card 104, the verification of user identity, and/or the authentication of transactions.

Still referring to FIG. 1, the contactless card 104 (or, smart card) is a transaction card associated with the user or customer. The contactless card 104 is associated with an account of the user. In one embodiment, the transaction card is a payment card associated with a charge account (e.g., a line of credit, a checking account, a prepaid account, and the like). In another embodiment, the contactless card 104 is a non-payment card that is associated with an account of the user (e.g., a loyalty card). In the example shown, the contactless card is a credit card. But, as alluded to above, the contactless card 104 may be any type of transaction card such as a rewards card, a loyalty card, etc. such that the disclosure provided herein is also applicable with these card configurations.

In the example shown, the contactless card 104 includes a magnetic stripe 136, and a chip 115. Because the chip 115 is structured to allow contactless communications, the chip or interface 115 may also be referred to herein as a "contactless enabled chip." In some embodiments, the contactless enabled chip 115 may be a dual interface chip that has the same or similar structure as a dual interface EMV chip. The "dual interface" characteristic means that the contactless enabled chip 115 is enabled to transmit information in a contactless manner and in a contact manner. For example, the chip may transmit information on the card (e.g., such as the record containing the URL) via a contactless communication and also have the physical contacts that allow for the card to be dipped into a reader (i.e., a contact manner). Thus, there is one chip—chip 115—that is structured for contactless and contact transactions. As mentioned above, the chip 115 may be an EMV chip. In other embodiments, the chip 115 may only be capable of performing contact or contactless transactions. As described herein, the chip 115 of the contactless card 104 is structured to enable contactless transactions. The magnetic stripe 136 is structured to transmit payment data when swiped through a magnetic stripe reader. In some embodiments, the magnetic stripe may be omitted from the contactless card 104. The contactless card 104 may also include visible information on the face and/or back of the card and digital information stored within the various structures of the contactless card 104. For example, the contactless card 104 can include a customer's name, a transaction card account number, an expiration date, and the like that is printed or embossed on the physical card. The contactless card 104 may also include more detailed identifying customer information (e.g., a customer identification number from the issuer) and account information (e.g., account numbers, information regarding the card issuer, expiration date, and so on) in the magnetic stripe 136, or an onboard the contactless enabled chip 115.

The contactless enabled chip 115 (or, contactless interface or transceiver) is a defining feature of the "contactless" aspect of the contactless card 104. The contactless enabled chip 115 is a small circuitry system configured to wirelessly exchange data with a contactless reader. For example, the contactless enabled chip 115 can exchange data via RFID. In the example shown, the contactless enabled chip 115 is structured to enable a contactless communication. Thus, in the example shown, the contactless enabled chip 115 includes a contactless transceiver. In other alternate embodiments, the contactless enabled chip 115 may enable a different short-distance communication form, such as a Bluetooth transmission. Accordingly, in these embodiments, the contactless enabled chip 115 may include the relevant associated structures (e.g., a Bluetooth antenna).

The contactless enabled chip 115 is configured to selectively store and transmit various types of information 114. As shown, the information 114 includes a payment application 191. The payment application 191 stores data and programs structured to enable a payment via the contactless card 104. Examples of such payment application 191 data and programs may include, but are not limited to, terminal risk management data, card risk management data, issuer application data, secret data such as keys, or customer exclusive data.

In some embodiments, the contactless enabled chip 115 may have or store information that includes identifying customer information. In some arrangements, one or more pieces of information may be transmitted as a token. For example, the account number associated with the card may be tokenized to obscure the actual account number. The token, when received by the card issuer computing system 108 via a payment network, can be cross referenced against a token vault to identify the actual payment information (e.g., the actual account number associated with the customer). Moreover, the card issuer computing system 108 and/or one or more servers of the payment network may cross reference the actual payment information with a stored information regarding the customer (e.g., legal name, address, phone number, email, etc.) in order to verify information entered by the user into the customer device 102. For example, a user may enter information (e.g., legal name, phone number, email, etc.) into the customer device 102 during a process of applying for a new account at a financial institution via a portal displayed on the customer device 102. The information may then be transmitted via the network to the provider institution computing system 108 for account creation. The customer device 102 may re-direct to display a prompt to the customer to verify the entered information via a tap with a contactless card. In some embodiments, the contactless card 104 may be associated with a third party provider. In some embodiments, the contactless card 104 may be associated with an existing account of the customer at the issuing institution. The contactless card 104 is then tapped to the customer device 102 causing the customer device 102 to receive payment information from the contactless card and transmit the payment information via the network to the merchant. In this example, the merchant may be associated with the provider institution computing system 108 (e.g., associated with or owned by the same entity). The merchant formats the payment information received from the contactless card and sends an Address Service Verification (AVS) message to the issuer of the contactless card to validate the entered information. In response, the merchant receives a verification message that validates the entered information corresponds to the information associated with the contactless card. Moreover, if the entered information is validated, the merchant may format a payment authorization request with a nominal or zero transaction amount and send the payment authorization request via a respective payment network to the issuer of the card to validate a cryptogram generated at the customer device 102 in response to the contactless communication. In this way, the provider institution computing system 108 is able to verify the entered information (e.g., and identity of the customer) using the customer device 102 as a POS terminal and using the payment network. This example and other examples are discussed in further detail below in reference to FIGS. 2-4.

The provider institution computing system 108 may be owned by or otherwise associated with a provider institution. The provider institution may be a financial institution, such as commercial or private banks, credit unions, investment brokerages, and so on. The provider institution can also include any commercial entity capable of maintaining charge accounts, including retailers, vendors, service providers, and the like. In the example shown, the provider institution is an issuer of the contactless card 104. Accordingly, the provider institution and associated provider institution computing system may also be referred to herein as the card issuer and card issuer computing system 108. The card issuer computing system 108 is configured to manage charge accounts and authorize transactions involving debits from charge accounts associated with existing customers.

The provider institution computing system 108 includes an issuer network logic 116, a transaction card processing circuit 118, and a customer database 120. The issuer network logic 116 is structured to enable the card issuer computing system 108 to connect to and to exchange information over the network 106 with, for example, the customer device 102. The issuer network logic 116 may include a network interface structured to send and receive data over the network 106.

The customer database 120 is structured as a repository for information. In this regard, the customer database 120 is configured to store, hold, and maintain information for a plurality of customers of the provider institution. For example, the customer database 120 may store information for customers with issued cards (e.g., card 104), including for example, personal customer information (e.g., names, addresses, phone numbers, and so on) and financial information (e.g., associated financial institutions, account numbers, available credit, credit history, and so on). The information contained in the customer database 120 may be used by the card issuer computing system 108 to perform a variety of checks surrounding a given contactless card, including for example, confirming identifying customer information, determining a customer's transaction history, determining a customer's available credit, the activation status of the card, and so on.

The transaction card processing circuit 118 is structured to process or facilitate processing of transactions by the card 104 (e.g., transactions via cards issued by the provider institution). The transaction card processing circuit 118 is structured to receive a transaction card authentication request (e.g., payment authorization request) from the acquirer computing system 107 over the network 106 (or, via other communication means). The payment authorization request may be an industry standard payment message. The format of the industry standard payment message is dependent on the particular payment network associated with the contactless card. For example, in some embodiments, the industry standard payment message includes a token and a cryptogram. The token may be used to obscure sensitive data regarding at least one of the card 104, the account associated with the card, the customer device 102, or the customer. The cryptogram may be generated by the customer device 102 after the tap with the card 104.

The transaction card processing circuit 118 may be embodied as a processing circuit having one or more processors coupled to one or more memory devices. Thus, the transaction card processing circuit 118 may have the structure described herein. As alluded to above, the transaction card processing circuit 118 is structured to process transaction card applications, issue and activate transaction cards, approve transactions, approve entry into web-based accounts, and/or generally respond to information and requests received by the card issuer computing system 108. In some embodiments, the transaction card processing circuit 118 may include or utilize multiple processors throughout the card issuer computing system 108.

The acquirer computing system 107 may be owned by or otherwise associated with an acquiring institution. The acquiring institution may be a financial institution that processes credit or debit card payments on behalf of a merchant such as a merchant providing an e-commerce retail website, the merchant application 155 and/or developed the merchant application 155. The acquirer institution can also include any commercial entity capable of maintaining merchant accounts, including retailers, vendors, service providers, and the like. In some embodiments, the acquiring institution may be the same institution that owns or is otherwise associated with the provider institution computing system 108. In some embodiments, the acquiring institution may be a different institution from the institution that owns or is otherwise associated with the provider institution computing system 108. In the example shown, the acquiring institution is a provider of the merchant application 155 on the customer device 102. The acquirer computing system 107 is configured to manage associated merchants, receive a cryptogram generated by a terminal of the merchant (e.g., a POS terminal) as part of a transaction or contactless communication between the contactless card 104 and the customer device 102, and transmit the cryptogram via a payment network, to a respective provider institution computing system 108 in order to authorize a transaction.

The acquirer computing system 107 includes an acquiring network logic 172 and a processing circuit 171. The acquiring network logic 172 is structured to enable the acquirer computing system 107 to connect to and to exchange information over the network 106 with, for example, the customer device 102 and the provider institution computing system 108. The acquiring network logic 172 may include a network interface 126 structured to send and receive data over the network 106.

The processing circuit 171 may be embodied as a processing circuit having one or more processors coupled to one or more memory devices 128. Thus, the processing circuit 171 may have the structure described herein. As alluded to above, the processing circuit 171 is structured to facilitate in the processing of a transaction or a payment authorization request transmission. In some embodiments, the processing circuit 171 may include or utilize multiple processors throughout the acquirer computing system 107.

Figure 2:
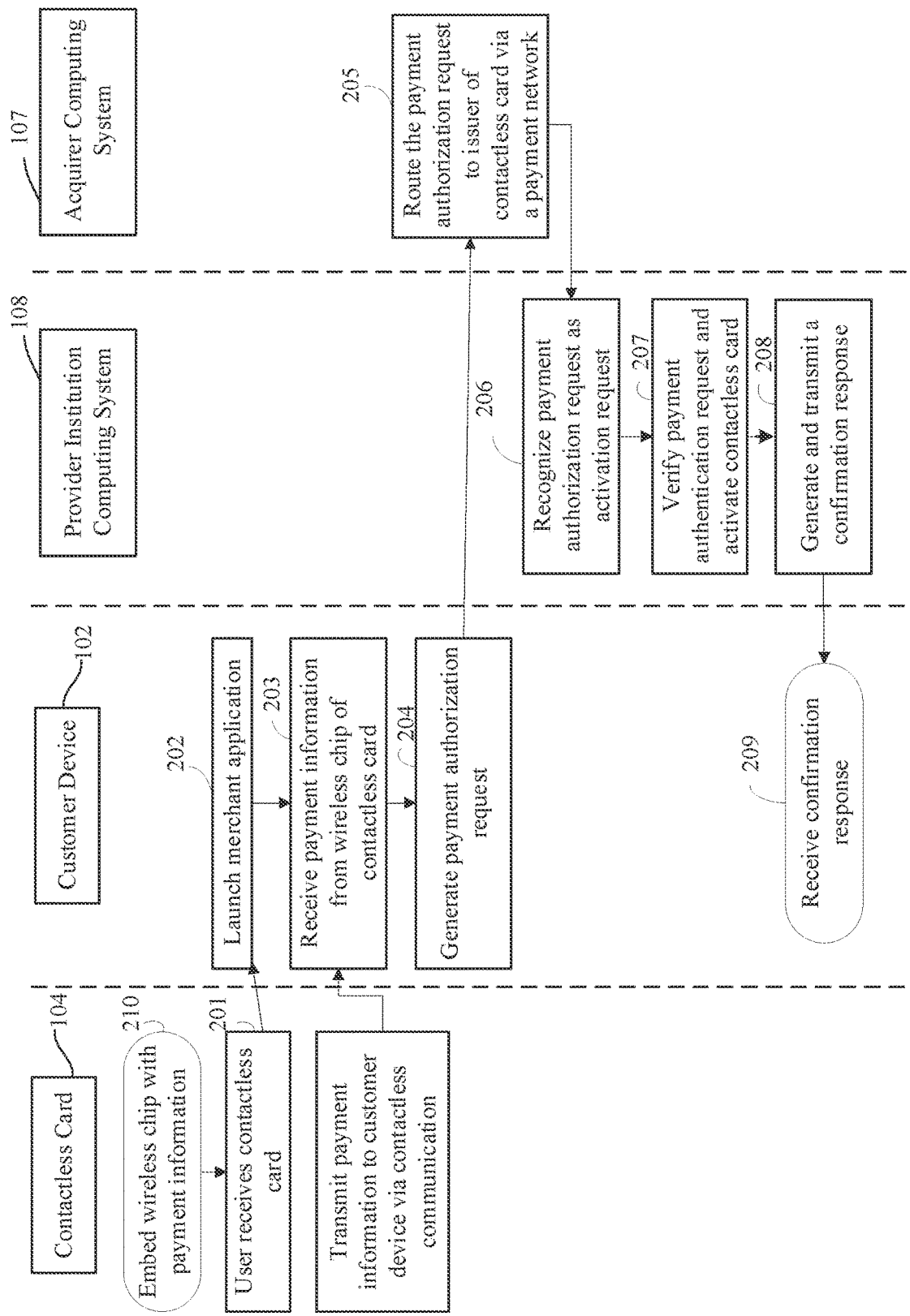
FIG. 2 is a flow diagram of a method of activating a contactless card in response to a contactless communication between a contactless card and a customer device, according to an example embodiment.

Referring now to FIG. 2, a method 200 of activating a contactless card 104 in response to a contactless communication between the contactless card 104 and the customer device 102 is depicted according to an exemplary embodiment. For example, a contactless card 104 may be issued to a user by an institution associated with the provider institution computing system 108 in response to receiving, processing, and/or underwriting an application of the user. The issuance of the contactless card 104 causes the contactless card 104 to be sent or transmitted to the user via, for example, mail in an inactive state. The user receives the contactless card 104 and then needs to activate the contactless card 104 before the contactless card 104 can be used, for example, for transactions. Traditionally, the user must either call a number provided with the contactless card 104 or manually navigate to a website associated with the provider institution and enter in various inputs (e.g., contactless card number and authentication information regarding the user) in order to activate the card. However, method 200 provides various processes that transforms and/or enables the system 100 to allow for the activation the contactless card 104 via a tap between the contactless card 104 and the customer device 102.

At process 201, the user receives the inactive contactless card 104 from a provider institution in response to an application being approved or in response to the provider institution issuing an updated card (e.g., new PAN because of detected fraud, new card because old contactless card expired, etc.). For example, the user may complete the application for a credit account at any of a number of brick and mortar locations. Or, as another example, the customer may create the application electronically, such as via a website displayed on the customer device 102. The new credit account application can be received by the transaction card processing circuit 118 from the network 106 via a customer device 102 or website. Upon receipt of the application, the transaction card processing circuit 118 may cause an underwriting of the credit account using typical and conventional processes. In this regard, identifying information regarding the customer provided in the application may be stored in the customer database 120, which can be used for underwriting as well as subsequent authentication or authorization of transaction requests. In response to the application approval, the transaction card processing circuit 118 may generate and transmit instructions to a physical contactless card manufacturer or personalization service that then personalizes a physical contactless card 104 for the new credit account with payment information at process 210 and the user information mails or otherwise sends the physical contactless card 104 to the user.

At process 202, the customer device 102 launches the merchant application 155. In this example, the merchant application 155 is a merchant application 155 that was created and provided by the provider institution. In this regard, the merchant application 155 may be in communication with the provider institution computing system 108 via the network 106 such some of the information displayed on the merchant application 155 is received from the provider institution computing system 108. In some situations, the merchant application 155 is offered by the provider institution (e.g., is a mobile banking application associated with the provider institution). For example, the merchant application 155 may be part of a more general banking application (e.g., an application where a customer can view account balances, view transactions, transfer funds, etc.) associated with the provider institution. The merchant application 155 may include executable code that causes one or more antennas 132 of the wireless interface 132 to energize in preparation for a close-range communication (e.g., a contactless communication and/or tap). The merchant application 155 prompts the user via the GUI to tap the contactless card 104, for example, in response to the user selecting an option on the merchant application 155 to activate the contactless card 104. In some embodiments, the merchant application 155 prompts the user via the GUI to tap the contactless card 104 to the customer device 102 automatically in response to the merchant application 155 launching and energizing the one or more antennas 130.

At process 203, the customer device 102 receives payment information from the contactless card 104 in response to a contactless communication (e.g., a tap). The user taps the contactless card 104 to the customer device 102 thereby causing, for example, the one or more antennas 130 to energize the chip 115 and read the information 114 from the contactless card 104 via a contactless communication. As indicated above, the information 114 includes payment application 191 that includes at least payment information that is used to identify a payment account of the user at the provider institution computing system 108.

At process 204, the customer device 102 generates a payment authorization request based on the payment information and transmits the payment authorization request to the acquirer computing system 107. The payment authorization request includes an algorithmic cryptogram generated by the customer device 102 using electronic keys and transaction data exchanged in the contactless communication. In an embodiment, the cryptogram is an EMV standard cryptogram. For example, code of the merchant application 155 causes the customer device 102 to act similar to a POS terminal that causes the payment authorization request and cryptogram to be generated and transmitted to the acquirer computing system 107. In an example, the acquirer computing system 107 may be owned or otherwise associated with the same institution that is associated with the provider institution computing system 108. For example, the acquirer, the provider of the merchant application 155, and provider/issuer of the contactless card 104 may all be associated with the same enterprise or institution in some examples.

In an example, the payment authorization request includes a payment amount of zero or a nominal amount (e.g., $0 or $0.01-$0.25). It is to be appreciated that the payment authorization request is not meant to be settled (e.g., post to the user's account). Rather, the payment transaction request is used as a secure method of activating the contactless card in this example. In other arrangements, the payment authorization request may result in a transaction of a nominal amount that is credited or reimbursed by the provider institution.

At process 205, the acquirer computing system 107 routes the payment authorization request to the provider institution computing system 108. In an example, the acquirer computing system 107 receives the payment authorization request including the cryptogram from the customer device 102 via the network 106 as a result of the contactless communication. The acquirer computing system 107 determines a payment network (e.g., Visa®, American Express®, Discover®, Mastercard®) to use based on the particular Bank Identification Number (BIN) of the contactless card account. The acquirer computing system 107 then transmits or routes the payment authorization request to the provider institution computing system 108 via the payment network as though the payment network is processing a transaction.

At process 206, the provider institution computing system 108 receives the payment authorization request and recognizes the payment authorization request is an activation request. That is, the provider institution computing system 108 receives the payment authorization request and cryptogram from the acquirer computing system 108 via a respective payment network. In some embodiments, the provider institution computing system 108 may identify the merchant as the merchant application 155 and the zero or nominal payment amount from the payment authorization request and determine that the payment authorization request is meant to activate the contactless card 104 for future use in transaction. For example, once the provider institution computing system 108 identifies the merchant, the provider institution computing system 108 may cross-reference the merchant within a database to determine that payment authorization request is an activation request. In various embodiments, the provider institution computing system 108 identifies the payment authorization request as a request to activate the contactless card 104 (e.g., the activation request) via alternative or additional processes. For example, the provider institution computing system 108 may recognize that the payment authorization request is associated with a contactless card 104 that has not been activated yet by cross-referencing information of the payment authorization request, such as the personal account number (PAN), within the customer database 120 to identify the account associated with the contactless card 104. The account in the customer database 120 may have an indication within a data field therein that the contactless card 104 has not been activated yet. For example, the provider institution computing system 108 may identify the merchant based on a portion of the information within the payment authorization request (e.g., the BIN). Further, the provider institution computing system 108 may then determine that the merchant was provided by the provider institution and that the merchant application 155 that generated the payment authentication request is meant for activation of the contactless card 104.

At process 207, the provider institution computing system 108 verifies the activation request and activates the contactless card 104. In an example, the provider institution computing system 108 may calculate a cryptogram based on information received regarding the payment authorization request and a cryptographic key or code stored within the provider institution computing system 108 and compare the calculated cryptogram received as part of the payment authorization request with the calculated cryptogram. If the cryptogram and the generated second cryptogram match, the provider institution computing system 108 has verified the activation request. In response to verifying the activation request, the provider institution computing system 108 may then activate the contactless card 104, for example, by updating the data field (e.g., a status field) within the account stored in the customer database 120 to a value that indicates that the contactless card 104 is activated for future use in transactions. In other examples, the activation of the contactless card 104 may occur via updating various other data fields within the provider institution computing system 108 or adding information regarding the contactless card 104 to a stored list of activated cards. The activation then allows for the contactless card 104 to be used to complete further transactions.

In some embodiments, additional or alternative verification steps are taken before the contactless card is activated. For example, the provider institution computing system 108 may identify the customer device 102 via an industry standard method of identifying the customer device. In some embodiments, the provider institution computing system 108 identifies the customer device based on an internet protocol (IP) address or a mobile service identification number (MSIN) received as part of the payment authorization request and/or received directly from the customer device 108. The provider institution computing system 108 may then cross-reference the identity of customer device 102 within the customer database 120 to determine whether the customer device 102 is associated with (e.g., bound) to the account associated with the contactless card 104. In another example, the provider institution computing system 108 may transmit a request to a third party computing system that is owned by a third party that includes the customer information associated with the account (e.g., customer information accessed or retrieved from the customer database 120) and the identification of the customer device 102. The provider institution computing system 108 may then receive back from the third party computing system an indication of whether the customer device 102 is associated with the customer information. In this way, the provider institution computing system 108 may leverage other institutions databases to check or verify if a customer device 102 is associated with the user of the contactless card 104 before activating the card. In some embodiments, once the provider institution computing system 108 determines that the customer device 102 is associated with the customer information, the provider institution computing system 108 may bind the information regarding the customer device 102 to the account associated with the contactless card, for example, by updating the customer database 120 with the information regarding the customer device 102.

At process 208, the provider institution computing system 108 transmits a confirmation response to the customer device 102 in response to the activation of the contactless card 104. In an example, the confirmation response is generated by the provider institution computing system 108 and transmitted directly to the merchant application 155 on the customer device 102 that causes a confirmation of the activation to be displayed to the customer. In various embodiments, the confirmation response may include a text message, e-mail, GUI, push notification, etc. In another example, the provider institution computing system 108 may transmit back via the payment network a confirmation of the payment authorization request to the acquirer computing system 107 that then transmits to the merchant application 155 the confirmation response via the network 106.

At process 209, the customer device 102 receives the confirmation notice. In some embodiments, the confirmation response may be automatically displayed via a GUI, for example within the merchant application 155, on the customer device 102 that is configured to notify the user that the contactless card 104 has been activated. Similarly, if the verification of the payment of the payment authorization request fails, then the provider institution computing system 108 may automatically generate and transmit a notification of the failed request and provide the user with additional instructions to activate the contactless card 104. In some embodiments, the confirmation response may also include an automatically generated email, push notification, or text message that is sent to the customer device 102 or contact information such as an email address of the customer that is stored within the customer database 120. An example of a confirmation response is provided below in reference to FIG. 5.

Figure 3:
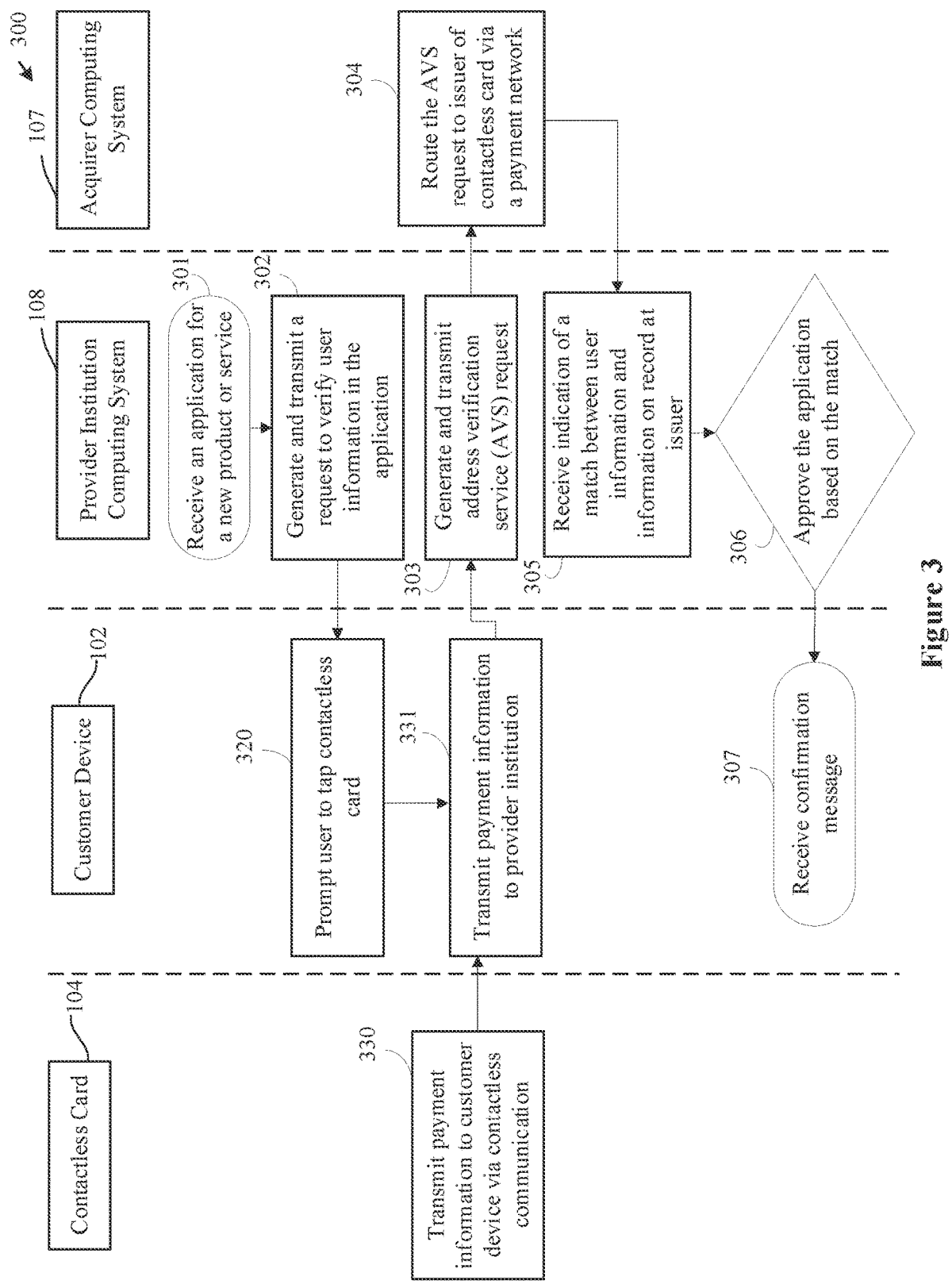
FIG. 3 is a flow diagram a method of verifying manually entered user information via a contactless card tap is shown, according to an example embodiment.

Referring now to FIG. 3, a method 300 of verification of user information via a contactless card tap is shown according to an example embodiment. As an example, method 300 generally refers to an embodiment where the customer device 102 is able to generate a POS transaction in order to authenticate a known customer or verify customer information received as part of an application. Method 300 may be implemented, for example, to enable the system 100 to verify user information entered by a user during a new account application (e.g., a new credit card account application) at the provider institution. For example, the user has a first contactless card 104 that was issued by a first provider institution. Continuing the example, the user applies for an account at a second provider institution by entering or providing user information for an application for the account to the second provider institution. The second provider institution then requests (e.g., via a graphical user interface on a customer device) for the user to tap the first contactless card to the customer device 102 that is then used to verify the user information via an address verification service (AVS) message to the first provider institution. Additional details and embodiments are discussed in further detail herein.

At process 301, the provider institution computing system 108 receives an application for a new account, product, or service. In some embodiments, the provider institution computing system 108 receives the application via a webpage or mobile application running on the customer device 102. The application includes user information (e.g., legal name of user/applicant, address, phone number, etc.) that was entered as part of the application process. For example, the user may have manually entered into the customer device 102 as part of the process of applying for the new account, product or service, or the information may have been pre-filled on the customer device 102.

At process 302, in response to receiving the application or as a part of the application process, the provider institution computing system 108 transmits a request to the customer device 102 to verify the user information entered into the application. The request may include a message or graphical indication displayed on the customer device 102 that prompts the user to tap a contactless card 104 already owned and activated by the user to the customer device 102 at process 320. In this example, the contactless card 104 is associated with an account at a different institution and not the provider institution that is receiving the application. In an example, the request may automatically cause the one or more antennas to activate 130 such that the user can proceed by tapping the contactless card 104 to the customer device 102 without further user inputs. In another example, the request may include instructions that prompt the user to download or access a merchant application 155 that transforms the customer device 102 into a POS terminal. That is, in the first example the merchant application 155 may be embedded within the application webpage or mobile application such that the user can verify the user information during the process of applying for the new account, product, or service. In the second example, the merchant application 155 may be separate from the application webpage or mobile application and the user may be prompted to navigate the customer device 102 to the merchant application 155 in order verify the user information via a tap after the application is received by the provider institution computing system 108. The customer device 102 receives the payment information from the contactless card 104 based on the contactless communication at process 330 and forwards the payment information to the provider institution computing system 108 at process 331.

At process 303, in response to the tap at process 330, the provider institution computing system 108 generates an address verification service (AVS) request and transmits the AVS request to the acquirer computing system 107. In an example, the AVS request is routed to a second provider institution computing system that is associated with or that issued the existing contactless card 104 that the user is in possession of. In an embodiment, the institution associated with the second provider institution computing system that receives the AVS request is not the same institution as the provider institution computing system 108 that received the application. For example, the provider institution computing system 108 that received the application may not have any information regarding the user applying for the new account, product, or service and want to verify some information regarding the user entered in the application process. Accordingly, the provider institution computing system 108 may leverage information stored by the second provider via the AVS request. The AVS request includes the user information received as part of the application process and the information received from contactless card 104 as part of the tap in order to verify the application for the new product or service.

At process 304, the acquirer computing system 107 routes the AVS request to the second provider institution computing system via a payment network associated with the contactless card 104. In some embodiments, the institution associated with the acquirer computing system 107 is the same institution associated with the provider institution computing system 108. Alternatively or additionally, the institution associated with the acquirer computing system 107 is may be a different institution than the institution associated with the provider institution computing system 108. In these examples, the acquirer computing system 107 is in communication with the provider institution computing system 108 in order to communicate a validation of information thereto.

At process 305, in response to the AVS request being received by the second provider institution computing system, the provider institution computing system 108 receives an indication of a match between the user information provided as part of the application and the information stored at the second provider institution computing system. In some embodiments, the indication is binary (e.g., yes, the information matches, or no, the information does not match). If the indication is negative, that the information does not match, the provider institution computing system 108 may reject the application and automatically send a notification or message to the customer or the customer device 102 that is configured to notify the user that the user information entered as part of the application could not be verified. It is to be appreciated that the indication of the match is one element in a decisioning process to approve or decline the application. For example, other elements and/or processes may also be used in order to approve or decline the application based on the context application and associated regulations. In some embodiments, the notification or message may be sent to the contact information received as part of the user information entered during the application. In some embodiments, the notification or message may be sent by an automatically generated email or text message from the provider institution computing system 108.

At process 306, in response to receiving the indication that the user information matches stored information at the second provider institution computing system, the provider institution computing system 108 approves or denies the application based at least in part on the match and completes the downstream processes of providing the user with the new products or services. For example, approval of the application is based at least in part on a positive indication received as part of the AVS request. Moreover, upon approval of the application, the provider institution computing system 108 may generate and transmit a confirmation response configured to notify the user that the application has been approved. In some embodiments, the notification or message may be sent to the contact information received as part of the user information entered during the application. In some embodiments, the notification or message may be sent by an automatically generated email or text message from the provider institution computing system 108. Alternatively or additionally, the notification or message may be sent directly to the customer device 102.

Moreover, upon approval of the application, the provider institution computing system 108 may automatically generate a data instance for the user and store the data instance within the customer database 120. For example, the data instance may include various data fields for the legal name, address, and contact information of the user. The data instance may also include various data fields regarding the new account created in response to the approval of the application such as account number and/or payment tokens. Moreover, the provider institution computing system 108 may automatically bind the customer device 102 to the new account. The binding may occur, for example, by storing information regarding or identifying the customer device 102 within the data instance. In this way, the provider institution computing system 108 may cross-reference the data instance at later times in order to ensure that any request, transaction, or access of the new account is from a trusted source (e.g., from the customer device 102 that has a high likelihood being the actual user and not a fraudster).

At process 307, the customer device 102 receives and/or displays the confirmation response that the application has been approved. In an embodiment, the confirmation message is provided on a display of the customer device 102 via a graphical user interface (GUI). The confirmation response may be automatically displayed via a GUI, for example within the merchant application 155 and/or the webpage or mobile application used by the customer to apply for the new account, product, or service, on the customer device 102 that is configured to notify the user that the application has been approved. The confirmation notice may include information regarding the next steps to complete the process of providing the user with the new product or service (e.g., a new contactless card) and/or selectable options that allow for the user to immediately set up an online account with the provider institution computing system 108. Alternatively or additionally, the confirmation message may include a push notification, text message, e-mail, or any other type of electronic notification. An example of the confirmation response is depicted and discussed in further detail below in reference to FIG. 6.

Figure 4:
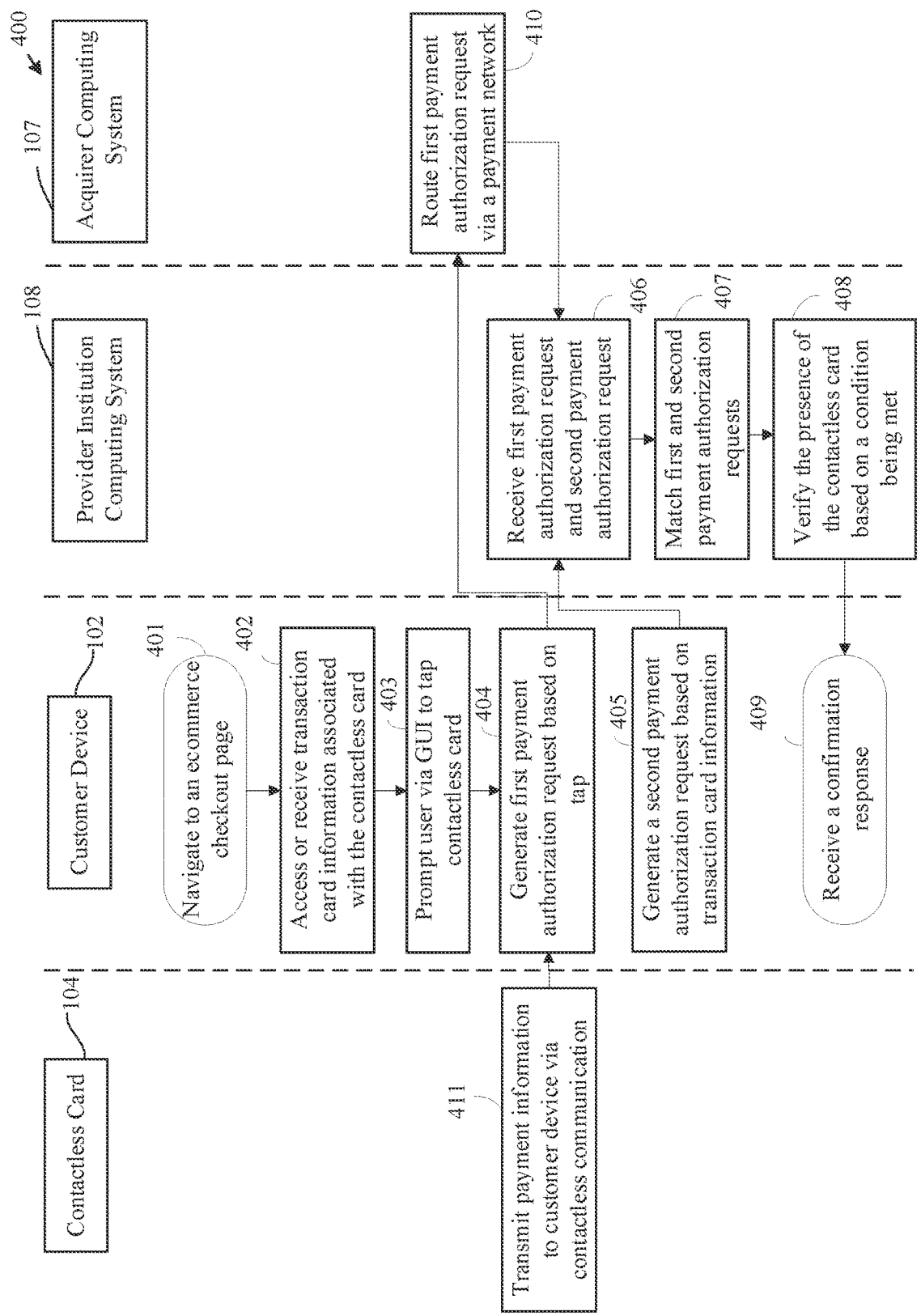
FIG. 4 is a flow diagram of a method of verifying the presence of a transaction card during an online (e.g., e-commerce) transaction, according to an example embodiment.

Referring now to FIG. 4, a flow diagram of a method 400 of verifying an online (e.g., e-commerce) transaction is depicted according to an example embodiment. As an example, a user during an online checkout from an e-commerce merchant manually enters transaction card information (e.g., transaction card information associated with the contactless card 104) into the e-commerce merchant website or mobile application. The e-commerce merchant website or mobile application then requests the user via a GUI to tap the contactless card 104 to the customer device 102 in order to verify the user is in possession of the contactless card 104. In response to the tap, a first transaction is completed via the information received as part of the tap (e.g., a $0 authorization transaction) and a second transaction is completed using the manually entered transaction card information. The first payment authorization request is routed through the acquirer computing system 107 and via the payment network to the provider institution to verify the cryptogram generated in response to the tap. In various embodiments, the provider institution provides an indication of approval of the first payment authorization back to the e-commerce merchant (e.g., via the payment network and the acquirer computing system 107) before the second payment authorization request is generated and/or transmitted. The indication of approval indicates to the e-commerce merchant that the card is present. In this way, the e-commerce merchant and/or associated acquirer can verify that the card is present before transmitting the second payment authorization request (e.g., the payment authorization request for goods or services from the e-commerce merchant). The second payment authorization request is routed through an acquirer computing system associated with the e-commerce merchant via the payment network. The provider institution computing system 108 matches the first payment authorization request and the second payment authorization request based on, for example, the temporal approximation (e.g., within 1, 2, 3, or 5 minutes of one another) of the first and second payment authorization requests to verify the customer is in possession of the contactless card 104. In response to the match, the provider institution computing system 108 may approve the transaction and transmits an indication of approval of the second payment authorization request. In this way, method 300 transforms or enables system 100 to verify e-commerce transactions in an improved manner that may reduce fraud and enhance the security of the computing systems.

At process 401, the customer device 102 is navigated to an e-commerce retailer's website or mobile application and, via various user inputs, the user selects one or more items or services to purchase from the merchant and proceeds to checkout. That is, a user may access a website of the e-commerce merchant/retailer via the internet on the customer device 102 via a traditional practice. The user may shop around and select the items that the user wishes to purchase. After finishing the shopping process, the user may proceed to a checkout page of the merchant that is displayed on the customer device 102.

At process 402, the customer device 102 accesses or receives transaction card information associated with a contactless card 104 for the purchase of the one or more items or services from the e-commerce merchant. The checkout page prompts the user to enter in, for example, the shipping address, billing address, and payment information (e.g., transaction card information). The transaction card information includes the account number associated with the contactless card, legal name of the user associated with the account, and/or associated billing information such as billing address. In some embodiments, the customer device 102 may automatically populate the fields based on stored information either locally at the customer device 102 or in the cloud by a third party (e.g., Apple®, Google®, etc.). In some embodiments, the user may populate the fields via manual user inputs including the transaction card information.

At process 403, the customer device 102 prompts the user via a GUI for the user to tap the contactless card 104 to the customer device 102. For example, the merchant, acquirer computing system, the payment network, and/or the provider institution computing system 108 may determine that additional verification is needed based on information identifying the customer device 102 (e.g., the customer device 102 is not associated or bound to the account associated with the contactless card 104), the type of items (e.g., the items are not the usual type that the customer usually gets), the payment amount (e.g., the payment amount is above a threshold or uncharacteristic of the user), the shipping address (e.g., the shipping address is uncharacteristic or has not been previously used by the user), and/or other information regarding the first payment authorization request. The merchant webpage or mobile application may, for example, before providing the user with confirmation of the transaction, prompt the user to tap the contactless card 104 with the customer device 102 in order to verify the user is in possession of the contactless card 104. In this way, the provider institution computing system 108 will be able to verify that the entered transaction card information has not been stolen or hacked.

In a first example, the mobile webpage or the mobile application of the merchant includes the functionality to automatically, upon providing the user with the prompt, energize the one or more antennas 130 for the tap. That is, as an example, the merchant application 155 may be integrated into the merchant webpage or the mobile application that enables the tap to occur (and further a $0 payment authorization using a cryptogram to occur). In some embodiments, the merchant may have an application programming interface (API) protocol that the merchant executes to establish an API session with the merchant application 155. In this example, the API session allows for the merchant application 155 (e.g., that enables the customer device to act as a POS terminal) to be displayed directly within the merchant webpage or mobile application and prompt the user to tap the contactless card to the customer device 102.

Alternatively or additionally, the merchant webpage or the mobile application may not have the functionality to act as a POS terminal similar to as described in reference to the merchant application 155. In this example, the provider institution computing system 108 may transmit a message (e.g., via an email, text message, or push notification) directly to the customer device 102 (or other customer device associated with contact information entered into the e-commerce webpage) that includes instructions and/or a hyperlink that, when selected, automatically causes the customer device 102 to launch and/or access the merchant application 155. In this example, the merchant application 155 is associated with the same institution as the provider institution computing system 108. The merchant application 155 may then automatically prompt the user to tap the contactless card 104 to the customer device 102. That is, in some embodiments, the merchant application 155 may be a separate application, webpage, or platform from the e-commerce merchant that provides the items that the user wishes to purchase, yet the e-commerce merchant may nevertheless leverage the merchant application 155 to verify the presence of the contactless card 104.

At process 404, the customer device 102 generates a first payment authorization request and transmits the first payment authorization request to the acquirer institution computing system 107 at process 410 in response to the tap. For example, the tap causes the payment information stored in the chip 115 to be transmitted to the customer device 102 at process 411. In response, the customer device 102 generates the first payment authorization request, the first payment authorization request including a cryptogram (e.g., an EMV standard cryptogram) generated by the customer device 102 based on, for example, code included in the merchant application 155. The first payment authorization request may include a zero or nominal payment amount (e.g., $0-$0.50). It is to be appreciated as described herein that the first payment authorization request is not meant to be settled. That is, the first payment authorization request is not intended to be used to settle a transaction that causes the account associated with the contactless card to be credited or debited. Rather, the first payment authorization request is meant to verify the possession of the contactless card 104 by the user. In other embodiments, the first payment authorization request is settled and later reimbursed by the provider institution.

At process 405, the customer device 102 generates a second payment authorization request for the checkout and transmits the second payment authorization request via the acquirer associated with the e-commerce merchant (e.g., e-commerce merchant acquirer computing system). The second payment authorization request includes an industry standard payment message generated using the entered payment information. In an example, the second payment authorization request includes the payment amount of the one or more selected items and the transaction card information. The second payment authorization request is then transmitted to an e-commerce merchant acquirer computing system for processing. In some embodiments, the second payment authorization request may be generated by the merchant computing system associated with the e-commerce merchant. In some embodiments, the customer device 102 and/or e-commerce merchant may not generated the second payment authorization request until an indication is received from the provider institution computing system 108 that the first authorization request has been approved. In this way, the e-commerce merchant and/or the first acquirer computing system may verify the presence of the transaction card before processing the transaction for the items selected (e.g., before generating and transmitting the second payment authorization request). In some embodiments, if the first payment authorization request is not approved by the provider institution computing system 108, the e-commerce merchant may not generate a second payment authorization request and instead provide the customer device 102 with a notification that the transaction could not be completed.

The first acquirer computing system is associated with an acquirer that provides the merchant with the e-commerce platform. That is, the first acquirer computing system is associated with an acquirer institution that provides the particular merchant with the e-commerce capabilities. Accordingly, first acquirer computing system is determined based on the particular merchant that the transaction associated with. In various embodiments, the acquirer institution may or may not be associated with the provider institution. The first acquirer computing system may then route the second payment request to the provider institution associated with the contactless card 104 to complete the transaction. In this example, the provider institution is the institution associated with the provider institution computing system 108. As such, the provider institution computing system 108 receives the second payment authorization request via a payment network associated with the contactless card 104 from the first acquirer computing system.

At process 406, the provider institution computing system 108 receives the first payment authorization request from the acquirer computing system 107 (e.g., generated from the merchant application 155) and the second payment authorization request. The first payment authorization request may include a first timestamp and the second payment authorization request may include a second timestamp. In various embodiments, the acquirer computing system 107 may or may not be associated with the same institution as the e-commerce merchant acquirer computing system. For example, the acquirer computing system 107 is an acquiring institution that is associated with the merchant application 155 used in the generation of the first payment authorization request and the e-commerce merchant acquirer computing system 107 is an acquiring institution that is associated with the e-commerce platform. The second payment authorization request (e.g., generated by the merchant associated with the e-commerce platform) is received via the acquirer of the e-commerce platform via the payment network.

At process 407, the provider institution computing system 108 matches the first payment authorization request with the second payment authorization request. For example, the provider institution computing system 108 may match the first payment authorization request and the second payment authorization request based at least on the cryptogram and/or payment information received as part of the first payment authorization request and the transaction card information received as part of the second payment authorization request. That is, the provider institution computing system 108 identifies that the first and second payment authorization requests are associated with the same contactless card 104 and matches them. In some embodiments, additional steps may be taken to match the first and second payment authorization requests such as verifying that the IP address associated with the first and second payment authorization requests are the same or that any differences therebetween are expected. In some embodiments, the additional steps may include matching customer device 102 identification information received in the first and second payment authorization requests are the same. In this way, the provider institution computing system 108 is enabled to ensure that the first authentication request is not spoofed or otherwise accidental. If the first and second payment authorization requests cannot be matched, the provider institution computing system 108 may automatically transmit a notification or message to the merchant and/or the user associated with the contactless card 104 of the error and/or rejection of the second payment authorization request.

At process 408, the provider institution computing system 108 verifies that the contactless card is present the second payment authorization request based at least in part on a condition being met between the first payment authorization request and the second payment authorization request. In an embodiments, the provider institution computing system 108 may approve the second authorization request based at least on part on the condition between the first and second authorization requests being satisfied. It is to be appreciated that the condition being met is merely one element of a decisioning process of approving or denying the second payment authorization request. As one example, the condition being met and the cryptogram being validated can be used to the authorization decision for the second payment transaction. In an embodiment, the condition is based on timing of the first and second authorization requests. For example, the provider institution computing system 108 compares the first and second timestamps. If the first and second timestamps are temporally positioned below a threshold (e.g., less than 1, 2, 3, 4, or 5 minutes), then the provider institution computing system 108 has verified the presence of the contactless card 104 and may approve the second payment authorization request based on that verification. In other embodiments, the second payment authorization request may be approved based on a decisioning process independent of the first payment authorization request and provider institution computing system 108 may later match the first and second payment authorization requests to verify that the card was present for the transaction.

At process 409, the customer device 102 receives and/or displays a confirmation response in response to the approval of the second payment authorization request. The confirmation response may be automatically displayed via a GUI, for example within the merchant application 155 and/or the merchant webpage or mobile application used by the user to purchase the one or more items, on the customer device 102 that is configured to notify the user that the second payment authorization request (the transaction for the items) has been approved. Moreover, the confirmation response may be provided by the merchant in some embodiments. For example, the merchant (e.g., computing system of the merchant and/or acquirer) may automatically redirect and/or email the customer a confirmation of the transaction and also provide an indication of an expected delivery of the one or more items. An example of the confirmation response is depicted and discussed in further detail below in reference to FIG. 7.

Figure 5:
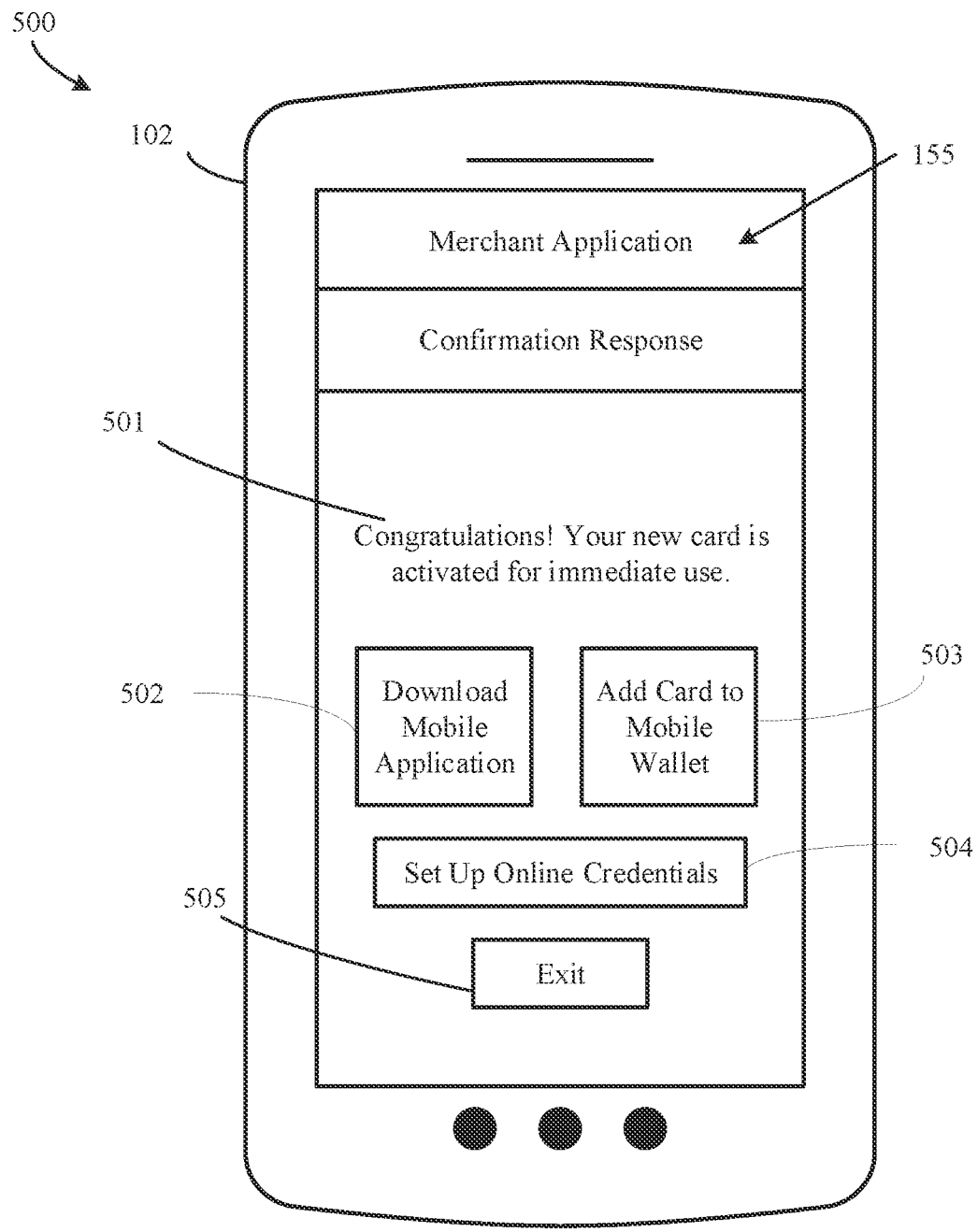
FIG. 5 depicts a customer device displaying a confirmation response on a graphical user interface (GUI) based on an activation of the contactless card, according to an example embodiment.

Referring now to FIG. 5, the customer device 102 displaying a confirmation response on a graphical user interface (GUI) 500 based on an activation of the contactless card according to an example embodiment is shown. The GUI 500, in this example, is part of the merchant application 155 and includes a textual notification 501 configured to notify the user that the contactless card 104 has been activated and is ready for immediate use in transactions. The GUI 500 also includes a first selectable icon 502, a second selectable icon 503, a third selectable icon 504, and a selectable exit icon 505. In an example, the first selectable icon 502 is configured to cause the customer device 102 to automatically navigate to an applications store on the customer device and provide the user with an option to download a mobile application associated with the provider institution of the contactless card 104. In some embodiments, the mobile application is an application that allows the user to login to the account of the user via an online portal and manage the account. The second selectable icon 503 is configured to cause the customer device 102 to automatically add the newly activated contactless card to a mobile wallet of the customer device. The third selectable icon 504 is configured to cause the customer device 102 to navigate the customer device 102 to an online web portal for the user to enroll the user in a web-based account for newly activated card. For example, the web-based account allows the user to manage the newly activated contactless card such as by viewing the current balance, setting user preferences, and/or making payments.

Figure 6:
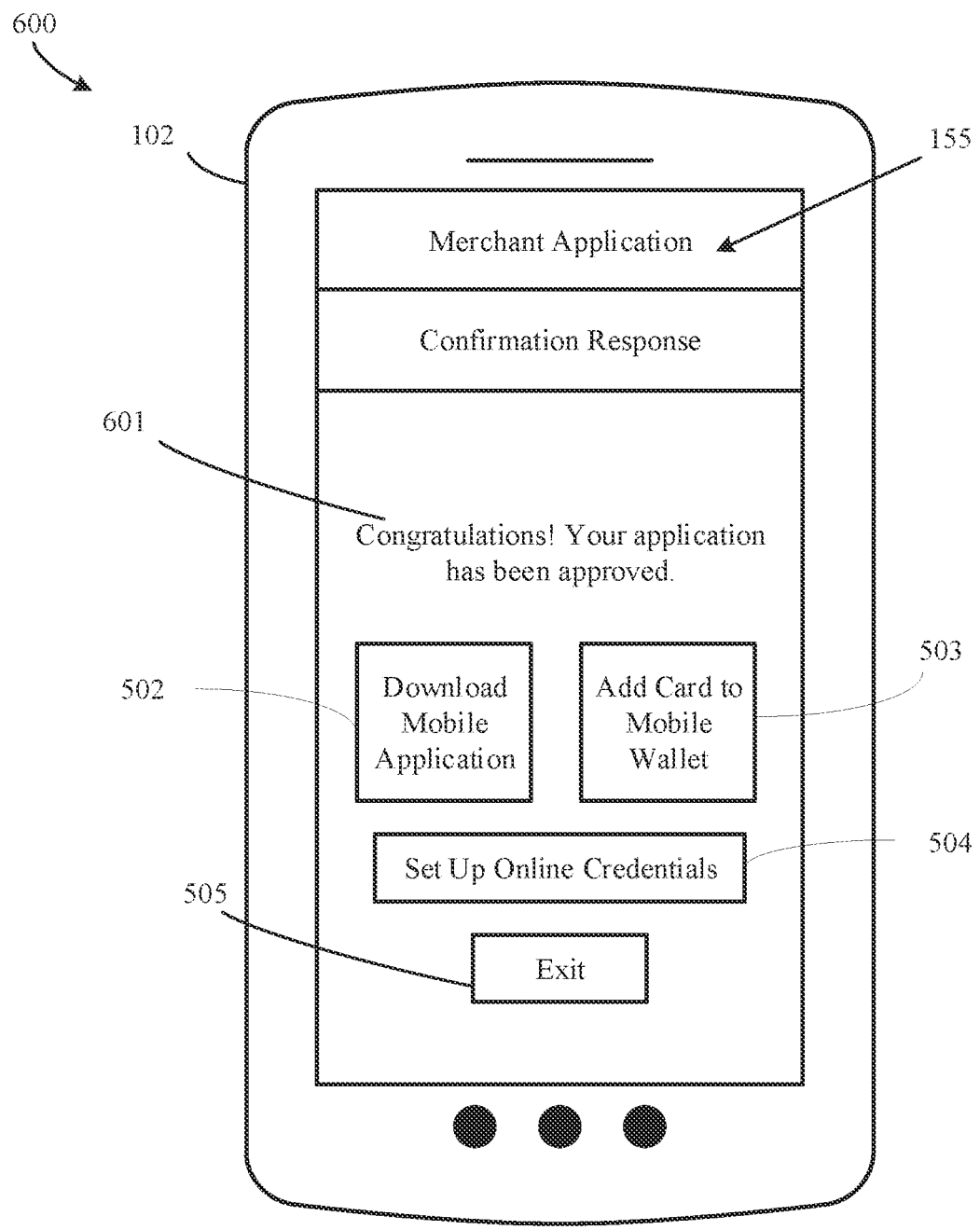
FIG. 6 depicts a customer device displaying a confirmation response on a graphical user interface (GUI) based on a verification of manually user information, according to an example embodiment.

Referring now to FIG. 6, the customer device 102 displaying a confirmation response on a graphical user interface (GUI) 600 based on an activation of the contactless card according to an example embodiment is shown. The GUI 600, in this example, is part of the merchant application 155 and includes a textual notification 601 configured to notify the user that the users application has been approved. The GUI 600 also includes the first selectable icon 502, the second selectable icon 503, the third selectable icon 504, and the selectable exit icon 505. The selectable exit icon 505 is configured to cause the customer device to exit the merchant application 155 and, for example, display a home screen. In some embodiments, the selectable exit icon 505 is configured to log the customer device 102 out of any portion of the merchant application that may have required authentication.

Figure 7:
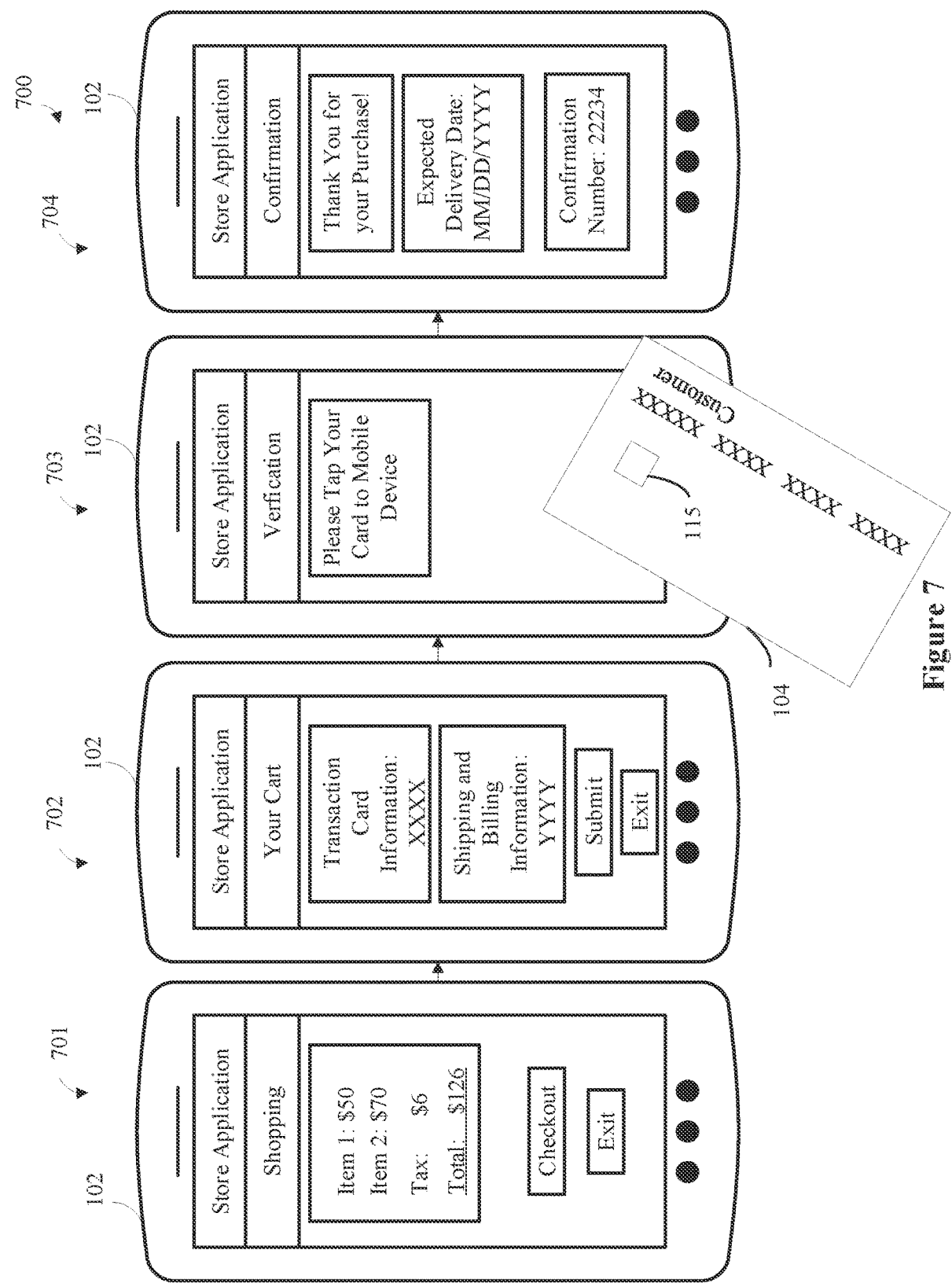
FIG. 7 depicts exemplary images of a customer device displaying graphical user interfaces during various processes of method described in reference to FIG. 4, according to an example embodiment.

Referring now to FIG. 7, exemplary images 700 of a customer device displaying graphical user interfaces during various processes of method 500 according to an example embodiment are shown. For example, the images 700 include a first depiction 701 of the customer device 102 displaying an e-commerce shopping screen within a store application. In this way, the first depiction of the customer device 102 is an example of a user-facing GUI related to process 401.

The images 700 also include a second depiction 702 of the customer device 102 displaying a cart of the user within the store application, for example, after the user has selected the items to purchase from the e-commerce retailer. The GUI in the second depiction 702 may be displayed in response to the user selecting a checkout icon in the GUI of the first depiction. For example, within the GUI displaying the cart, the user may be prompted to enter in the transaction card information, the shipping information, and billing information. The user may then select a submit icon to indicate to the merchant that the user has decided to make the purchase or transaction for the items in the cart. In this way, the GUI displaying the cart is generally related to process 402. That is, the second depiction 702 of the customer device 102 is an example of a user-facing GUI related to process 402.

The images 700 also include a third depiction 703 of the customer device 102 displaying a verification request. In this example, the merchant application 155 is embedded within the webpage or mobile application of the e-commerce retailer such that the verification request prompts the customer to tap the contactless card 104 to the customer device 104 in order to verify that the user of the customer device 102 is in possession of the physical contactless card 104 that is associated with the entered transaction card information. In this example, the third depiction 703 of the customer device 102 is an example of the user-facing GUI related to the processes 404, 405, and 411 of method 400.

The images 700 also include a fourth depiction 704 of the customer device 102 displaying a confirmation response within the store application, for example, after the user has tapped the contactless card 104 and the provider institution computing system 108 has approved the first transaction request. In an example, the confirmation response may be a standard confirmation screen generated by the e-commerce merchant based on the card issuer authorization decision. The confirmation response in this example includes a first textual notification that is configured to notify the user of the success of the purchase of the items within the cart. The confirmation response may also include a second textual notification that is configured to notify the user of the details of the purchase such as an expected deliver date and a third textual notification that includes the confirmation or order number for the purchase. In some embodiments, the textual notifications may include a selectable icon or hyperlink that allows the user to select the icon and, in response, cause the customer device 102 to automatically update the display with a new GUI that includes more detailed information. For example, the user may select the second textual notification or a hyperlink thereof that causes the customer device to automatically navigate to a website associated with a package carrier that will be making the delivery and display associated tracking information.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" or "computing system" may include hardware structured to execute the associated functions described herein. In some embodiments, each respective "circuit" or "computing system" may include machine-readable media for configuring the hardware to execute the associated functions described herein. The "circuit" or "computing system" may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" or "computing system" may include any type of component for accomplishing or facilitating achievement of the associated operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" or "computing system" may also include one or more processors communicatively coupled to one or more memory or memory devices. In this regard, the one or more processors may execute instructions stored in the memory or may execute instructions otherwise accessible to the one or more processors. The one or more processors may be constructed in a manner sufficient to perform at least the associated operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" or "computing system" as described herein may include components that are distributed across one or more locations.

An exemplary system for implementing the overall system or portions of the embodiments might include a computer(s), including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of verifying at least a portion of manually entered user information in an application, the method comprising:
receiving, by a provider institution computing system, an application for a new product or service, the application including entered user information of an applicant via one or more user inputs into a customer device;
providing a request to verify at least a portion of the user information to the customer device, the request configured to cause the customer device to prompt a user to tap a contactless card to the customer device;

based on a contactless communication between the contactless card and the customer device, generating an address verification service (AVS) message to a third party computing system, wherein the third party computing system is a provider of the contactless card;

receiving, by the provider institution computing system from the third party computing system, an indication that the portion of the entered user information and information stored by the third party computing system match; and approving, by the provider institution computing system, the application for the new product or service based at least in part on the indication of the match.

2. The method of claim 1, wherein providing the request to verify comprises providing a graphical user interface (GUI) on a merchant mobile application to the customer device to prompt the user to tap the contactless card to the customer device.

3. The method of claim 2, wherein the merchant mobile application is associated with the provider institution.

4. The method of claim 1, wherein the AVS message comprises payment information of the contactless card received based on the contactless communication and at least the portion of the entered user information.

5. The method of claim 1, further comprising:
generating a payment authorization request based on the contactless communication, the payment authorization request comprising a cryptogram and a zero payment amount;
transmitting the payment authorization request to the third party computing system via a payment network; and
receiving an indication that the payment authorization request has been approved by the third party computing system.

6. The method of claim 5, wherein approving the application is based at least in part on the indication that the payment authorization request has been approved.

7. The method of claim 1, wherein the indication that the portion of the entered user information and information stored by the third party computing system match is a binary indication.

8. The method of claim 1, further comprising determining that the application is not for a current customer of the provider institution by cross-referencing the entered user information within a customer database.

9. The method of claim 8, further comprising adding the applicant and the entered user information to the customer database in response to approving the application.

10. A system comprising:
a processor; and
a memory storing instructions that, when executed by the processor, cause operations comprising:
receive an application for a new product or service, the application including entered user information of an applicant via one or more user inputs into a customer device;
provide a request to verify at least a portion of the user information to the customer device, the request configured to cause the customer device to prompt a user to tap a contactless card to the customer device;
based on a contactless communication between the contactless card and the customer device, generate an address verification service (AVS) message to a third party computing system, wherein the third party computing system is a provider of the contactless card;
receive, from the third party computing system, an indication that the portion of the entered user information and information stored by the third party computing system match; and
approve the application for the new product or service based at least in part on the indication of the match.

11. The system of claim 10, wherein to provide the request to verify the memory includes instructions stored thereon that, when executed by the processor, cause operations comprising provide a graphical user interface (GUI) on a merchant mobile application to the customer device to prompt the user to tap the contactless card to the customer device.

12. The system of claim 10, wherein the merchant mobile application is provided by the system and configured to transform the customer device into a point-of-sale (POS) merchant terminal.

13. The system of claim 10, wherein the AVS message comprises payment information of the contactless card received based on the contactless communication and at least the portion of the entered user information.

14. The system of claim 13, the memory including instructions stored thereon that, when executed by the processor, cause operations comprising:
generate a payment authorization request based on the contactless communication, the payment authorization request comprising a cryptogram and a zero payment amount;
transmit the payment authorization request to the third party computing system via a payment network; and
receive an indication that the payment authorization request has been approved by the third party computing system.

15. The system of claim 14, wherein approving the application is based at least in part on the indication that the payment authorization request has been approved.

16. The system of claim 10, the memory including instructions stored thereon that, when executed by the processor, further cause operations to store the entered user information within a data instance of a customer database in response to approving the application.

17. A non-transitory computer-readable medium storing instructions that, when executed by one or more processors cause operations comprising:
receive an application for a new product or service, the application including entered user information of an applicant via one or more user inputs into a customer device;
provide a request to verify at least a portion of the user information to the customer device, the request configured to cause the customer device to prompt a user to tap a contactless card to the customer device;
based on a contactless communication between the contactless card and the customer device, generate an address verification service (AVS) message to a third party computing system, wherein the third party computing system is a provider of the contactless card;
receive, from the third party computing system, an indication that the portion of the entered user information and information stored by the third party computing system match; and
approve the application for the new product or service based at least in part on the indication of the match.

18. The non-transitory computer-readable medium of claim 17, wherein to provide the request to verify the further comprises operations to provide a graphical user interface (GUI) on a merchant mobile application of the customer device to prompt the user to tap the contactless card to the customer device.

19. The non-transitory computer-readable medium of claim 17, wherein the AVS message comprises payment information of the contactless card received based on the contactless communication and at least the portion of the entered user information.

20. The non-transitory computer-readable medium of claim 17, wherein the operations further comprise operations to provide a confirmation response to the customer device in response to approving the application.

* * * * *